United States Patent
O'Meara

(10) Patent No.: US 12,435,977 B2
(45) Date of Patent: Oct. 7, 2025

(54) RECEPTACLE FOR A SPIRIT LEVEL OR STRAIGHT EDGE TOOL

(71) Applicant: James O'Meara, Caulfield (AU)

(72) Inventor: James O'Meara, Caulfield (AU)

( * ) Notice: Subject to any disclaimer, the term of this patent is extended or adjusted under 35 U.S.C. 154(b) by 235 days.

(21) Appl. No.: 18/016,487

(22) PCT Filed: Jul. 20, 2021

(86) PCT No.: PCT/AU2021/050781
§ 371 (c)(1),
(2) Date: Jan. 17, 2023

(87) PCT Pub. No.: WO2022/016215
PCT Pub. Date: Jan. 27, 2022

(65) Prior Publication Data
US 2023/0273020 A1    Aug. 31, 2023

(30) Foreign Application Priority Data

Jul. 24, 2020 (AU) ............................... 2020902584
Jul. 28, 2020 (AU) ............................... 2020101521

(51) Int. Cl.
*G01C 9/28* (2006.01)
*G01D 11/30* (2006.01)

(52) U.S. Cl.
CPC ............... *G01C 9/28* (2013.01); *G01D 11/30* (2013.01)

(58) Field of Classification Search
CPC ...... G01D 11/30; G01C 9/28; E04H 12/2238; E04H 12/2269
See application file for complete search history.

(56) References Cited

U.S. PATENT DOCUMENTS 6,729,089 B1 * 5/2004 Spragg ................ E04H 12/2238
248/346.03
7,188,724 B1 * 3/2007 Crain ..................... B25H 3/006
206/349

FOREIGN PATENT DOCUMENTS

| CN | 203569958 U | 4/2014 |
| CN | 205369958 U | 7/2016 |
| CN | 208536831 U * | 2/2019 |
| DE | 3839013 A1 | 5/1990 |
| EP | 0818594 A1 | 1/1998 |
| KR | 20-1998-0063749 U | 11/1998 |

OTHER PUBLICATIONS

Examination Report under Section 18(3) for corresponding Application No. GB2302243.7, mailed on Jul. 17, 2024.
(Continued)

*Primary Examiner* — Kristina M Deherrera
*Assistant Examiner* — Gedeon M Kidanu
(74) *Attorney, Agent, or Firm* — Notaro, Michalos & Zaccaria P.C.

(57) ABSTRACT

A receptacle for seating at least a portion of a spirit level, straight edge tool or other hand tool is disclosed. The present disclosure also relates to a receptacle in which at least a portion of a spirit level, straight edge tool or other hand tool is seated and to a method for temporarily seating a spirit level, straight edge tool or other hand tool by placing at least a portion of the spirit level, straight edge tool or other hand tool into the receptacle. The receptacle can be prepared by injection molding or 3-D printing.

11 Claims, 5 Drawing Sheets

(56) References Cited

OTHER PUBLICATIONS

Examination Report for corresponding United Kingdom application No. GB2302243.7, mailed Oct. 13, 2023.
Extended European Search Report for corresponding Application No. EP21846484, mailed on Sep. 26, 2024.
Examination Report under Section 18(3) for corresponding Application No. GB2302243.7, mailed on Nov. 5, 2024.
Examination Report under Section 18(3) for corresponding Application No. GB2302243.7, Mailed on Dec. 13, 2024.
PCT International Search Report (PCT/AU2021/050781)—dated Oct. 21, 2021.
PCT Written Opinion of the International Searching Authority (PCT/AU2021/050781)—dated Oct. 21, 2021.
International Application Status Report (PCT/AU2021/050781)—report generated Dec. 22, 2022.
Kitchen knife Wikipedia article, https://en.wikipedia.org/w/index.php?title=Kitchen_knife&oldid=937076390 Section and image entitled knife block. It would appear suitable for receiving a steel ruler. Dated Jan. 22, 2020.
Ruler stand Thingiverse, https://www.thingiverse.com/thing:1194895 Entire page. Dated Dec. 12, 2015.
Vintage Mitutoyo Height Gauge, https://ebay.co.uk/itm/386627638542 Entire page. Listing new but item described as "vintage".
Folding ruler holder Thingiverse, https://www.thingiverse.com/thing:4391475 Entire page. Dated May 24, 2020.
Nun Ruler Holder, https://robertasrandom.blogspot.com/2010/10/nun-ruler-holder.html Entire page. Dated Nov. 11, 2010.
United Kingdom Examination Report for corresponding GB Application No. GB 2302243.7, dated Mar. 2, 2024.
Examination Report under Section 18(3) for corresponding Application No. GB2302243.7, mailed on May 13, 2024.
Japanese Office Action for corresponding Japanese application No. 2023-501790, dated Apr. 17, 2025.
Israeli Office Action for corresponding Israel application No. 299965, dated Jun. 29, 2025.

\* cited by examiner

RECEPTACLE FOR A SPIRIT LEVEL OR STRAIGHT EDGE TOOL

TECHNICAL FIELD

The present invention relates to a receptacle for a spirit level, straight edge tool or other hand tool.

BACKGROUND OF THE INVENTION

A spirit level is an everyday item and designed to indicate whether a surface is horizontal or vertical. A spirit level typically includes a curved glass vial filled with a liquid (such as alcohol). The position of an air bubble in the liquid in the vial determines whether or not the surface is perfectly level. In the building trade, particularly in construction, spirit levels are an essential tool. They are typically provided in the form of a robust elongated stick containing at least one of the curved glass vials. A problem with spirit levels is that they can be expensive, cumbersome and bulky. When temporarily not in use at a worksite, spirit levels are typically leant up against walls, placed on the ground or on another surface (which may unstable or uneven). Where a spirit level is placed can lead to accidents or damage at the worksite and/or damage or breakage to the spirit level (particularly the glass vial). There have been multiple occasions where this has occurred, for example, a spirit level placed against a painted wall which has slipped and damaged the wall, a spirit level placed on a surface where it has been knocked off breaking a glass window and a spirit level being bumped, hitting and injuring a tradesman. Another problem is that sometimes tradesmen forget where they placed the spirit level or place it in a place which not readily accessible, for example, a vehicle parked off-site. Many of these problems also apply to straight edge tools and other hand tools.

It would be desirable to provide a device which allows a spirit level, straight edge tool or other hand tool to be temporarily housed at a worksite while it is in use and enabling it to be readily accessible, or provide a suitable alternative.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

BRIEF SUMMARY OF THE INVENTION

In a first aspect, the present invention provides a receptacle for seating at least a portion of a spirit level, straight edge tool or other hand tool.

In a second aspect, the present invention provides a receptacle in which at least a portion of the spirit level, straight edge tool or other hand tool is seated.

In a third aspect, the present invention provides a method for temporarily seating a spirit level, straight edge tool or other hand tool by placing at least a portion of the spirit level, straight edge tool or other hand tool into a receptacle for seating at least a portion of the spirit level, straight edge tool or other hand tool.

In a fourth aspect, the present invention provides a method of preparing a receptacle for seating at least a portion of a spirit level, straight edge tool or other hand tool according to the first or second aspect wherein the receptacle is prepared by injection moulding or 3D printing.

BRIEF DESCRIPTION OF THE DRAWINGS

The invention will now be described with reference to the following non-limiting drawings.

DETAILED DESCRIPTION OF THE INVENTION

Figure 1:
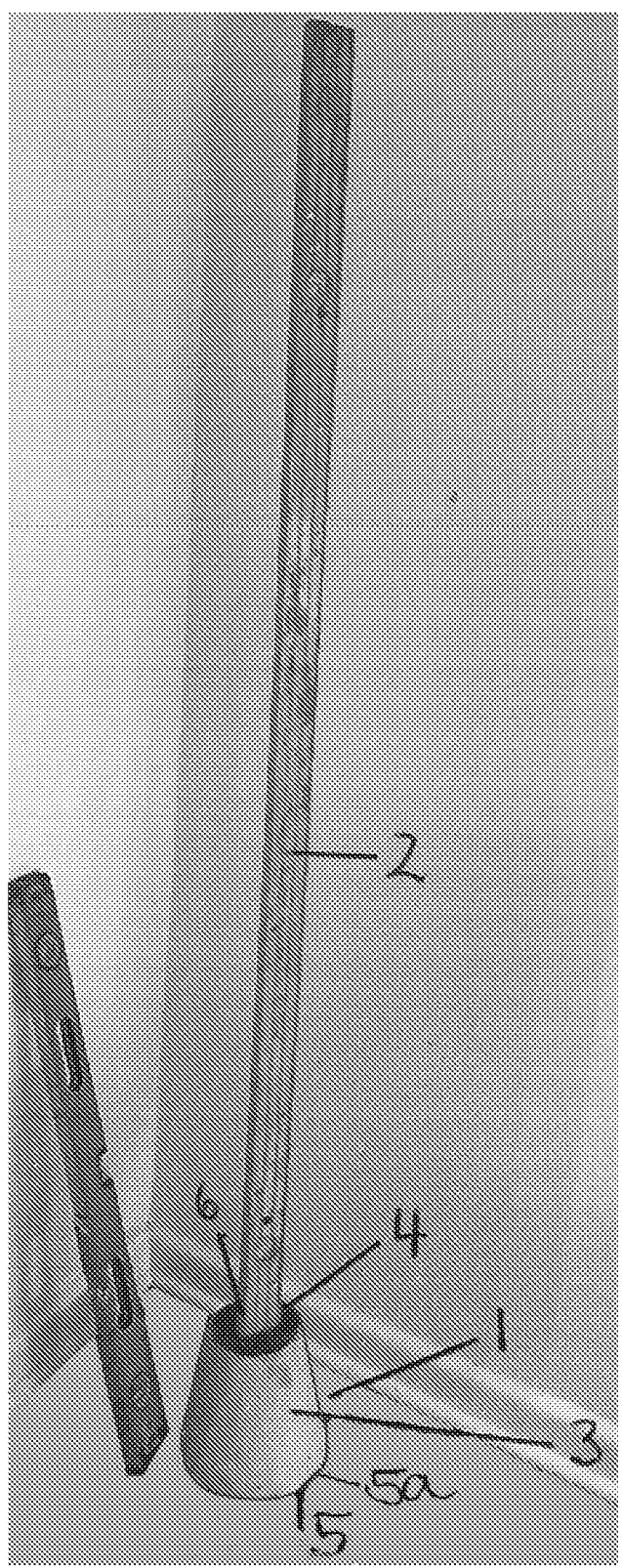
FIG. 1 is a photograph of a receptacle in accordance with one embodiment of the present invention in which a spirit level is seated.

The present invention relates to a receptacle for seating at least a portion of a spirit level, straight edge tool or other hand tool. The present invention also relates to a receptacle in which at least a portion of a spirit level, straight edge tool or other hand tool is seated and to a method for temporarily seating a spirit level, straight edge tool or other hand tool by placing at least a portion of the spirit level or straight edge tool into a receptacle for seating at least a portion of the spirit level, straight edge tool or other hand tool. The present invention also relates to a method of preparing a receptacle for seating at least a portion of a spirit level, straight edge tool or other hand tool according to the first or second aspect wherein the receptacle is prepared by injection moulding or 3D printing.

In one or more embodiments the spirit level is suitably any spirit level used in the building and/or construction industry such as an i-beam (girder) level, box beam level, torpedo level or scaffold level. In one or more embodiments the straight edge tool is a ruler, block plane or square and suitably similar in size to a spirit level but typically longer. In one or more embodiments the other hand tool is one or more of an awl, broom, chisel, file, gimlet, hammer, knifes, mallet, pincers, pliers, punch, rake, rasp, ratchet, screwdriver, saw, scissors, snip, spanner, or wrench or other suitable tool such as any tool with a seatable portion. In one or more embodiments the spirit level or straight edge tool suitably has a rectangular cross-section, although the receptacle can be modified to accommodate any spirit level, straight edge tool or other hand tool as required. For example, the receptacle can be modified to accommodate tools with circular, ovoid, square, triangular or other cross-sections.

In one or more embodiments the receptacle suitably includes a body having a base and an upper surface, the upper surface including an opening for receiving the spirit level, straight edge tool or other hand tool and providing access to an internal space provided in the body for seating at least a portion of the spirit level, straight edge tool or other hand tool. In one or more embodiments the body has a cylindrical or conical shape although any suitable shape can be used including a rectangle, polygonal, triangle, square, ovoid (egg-shape) shape or other suitable shape. In one or more embodiments the body is a semi sphere or dome shape. In one or more embodiments the body is suitably tapered from the upper surface to the base. In one or more embodiments the body is suitably weighted towards the base. In one or more embodiments the body includes a solid base. In one or more embodiments approximately 40 to 60 percent or more (for example 40, 45, 50, 55 or 60 percent) of the total weight of the receptacle is distributed at the base to ensure stability. In one or more embodiments the body suitably includes a rebated handle. In one or more embodiments the rebated handle includes lip defining a recessed portion suitably for accommodating a finger or thumb. In or more embodiments the base includes a substantially flat portion (suitably for resting or sitting flat on a level surface), although the base can be designed so that it will sit on a non-flat surface if required. In one or more embodiments the receptacle body, suitably the base may include one or more recesses or mounts for seating or mounting one or more wheels, typically a roller wheel. Provision of at least one wheel in the receptacle body/base suitably enables the receptacle (containing or not containing the spirit level, straight edge tool or other hand tool) to be rocked onto the wheel(s) and moved within and outside the worksite.

In one or more embodiments the upper surface suitably includes a substantially flat portion and suitably the opening is centred in that portion, although the opening can be provided off-centre if desired. In one or more embodiments the opening and/or internal space has a shape complementary to the spirit level, straight edge tool or other hand tool to be seated. For example suitably the opening has a shape which substantially matches a cross-section of the portion of the spirit level, straight edge tool or other hand tool to be seated in the receptacle. In one or more embodiments the opening is suitably rectangular in shape although any suitable shape can be used including a circular, polygonal, triangular, square, ovoid (egg-shape) shape or other suitable shape. In one or more embodiments the internal space is suitably a channel or passageway. Suitably the internal space has a shape which substantially matches the portion of the spirit level, straight edge tool or other hand tool to be seated in the receptacle although any suitable shape can be used including a circular, rectangular, polygonal, triangular, square, ovoid (egg-shape) shape or other suitable shape which can accommodate at least a portion of the spirit level, straight edge tool or other hand tool. In one or more embodiments the internal space has a rectangular shape. In one or more embodiments the opening in the upper surface is located opposite the base and the channel or passageway is directed substantially vertically from the opening towards the base (it will be appreciated that the channel or passageway could also be angled from the opening if desired—particularly if the opening is not centred in the upper surface). In one or more embodiments, suitably where the opening to the internal space is too wide for a particular spirit level/straight edge tool, the opening to the internal space may be provided with a threaded rod and stop end which can be manipulated (suitably by turning) to close the gap in the opening, the stop end suitably abutting against the spirit level/straight edge tool and suitably thereby keeping the spirit level/straight edge tool as upright as possible.

In one or more embodiments the receptacle may be made from any suitable material including clay, glass, rubber, elastomers, metal, plastic (including photopolymers, thermoplastics or thermosetting polymers) or a blend thereof. In one or more embodiment the receptacle may be provided with a coloured exterior coating (for example fluoro yellow paint) for visibility. In one embodiment the receptacle is prepared by injection moulding or 3D printing.

The invention will now be described in non-limiting embodiments with reference to the drawings. Like reference numerals are used throughout the drawings to depict like or similar elements of the receptacle.

With reference to FIG. 1, one embodiment of a receptacle 1 for seating a spirit level 2 is shown. The receptacle 1 is in the form of a cone having a body 3 (in this case conical), an upper surface 4 and a base 5. The base has a flat portion 5a enabling the user to place it on a flat surface. An opening 6 is provided in the upper surface 4 for receiving the spirit level 2 and providing access to an internal space (not shown) for seating at least a portion of the spirit level 2. The body 3 is tapered from the upper surface 4 to the base 5.

Figure 2:
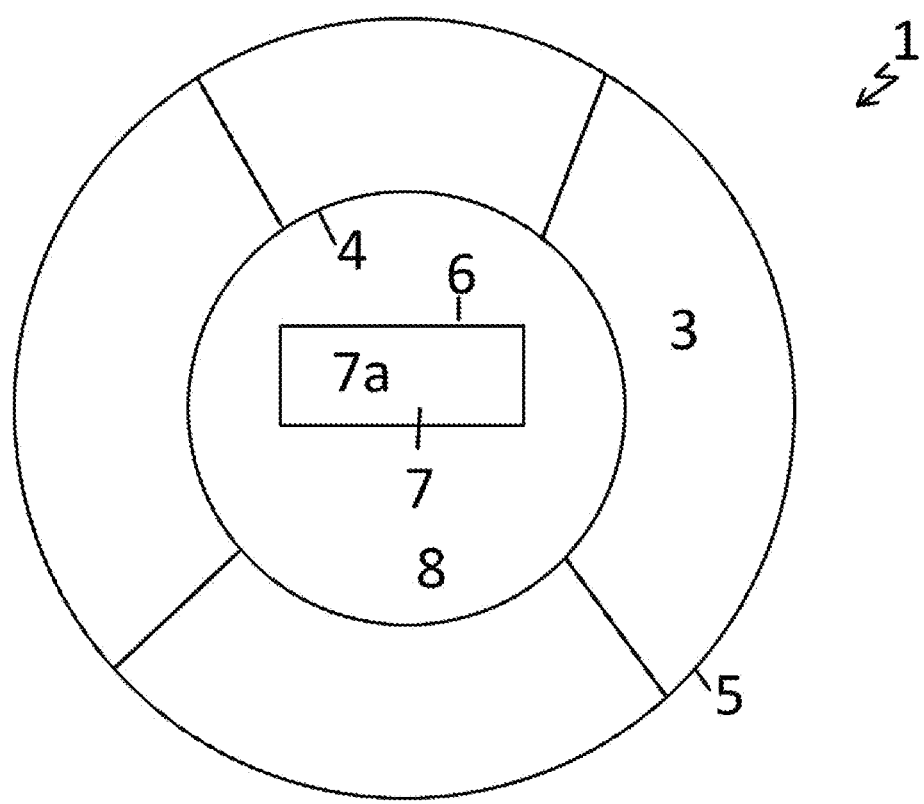
FIG. 2 is a drawing of the top view of the receptacle of FIG. 1.

FIG. 2 shows a top view of the receptacle 1. The upper surface 4 includes a relatively flat portion 8 suitably having a diameter of about 140 mm and in which the opening 6 is suitably centred. In this embodiment, the spirit level 2 has a rectangular cross section so in order to accommodate the spirit level 2 the opening 6 is also rectangular in shape. Suitably the opening has dimensions of 68 mm length and 33 mm width so as to accommodate a standard commercially available spirit level 2. The opening 6 provides access to an internal space 7 which in this embodiment is also suitably rectangular in shape having similar dimensions to the opening and forming a channel 7a. Suitably the channel has a depth of about 225 mm. Note that in this Figure, the channel is not located in the position as shown. The channel 7a is directed vertically from the opening towards the base 5. The body 3 from the edge of the substantially flat portion 8 of the upper surface 4 to the base 5 suitably has a length from top to bottom of about 275 mm. The base 5 suitably has a diameter of about 280 mm. Suitably the total weight of the receptacle 1 is about 7 kilograms so that it has weight to accommodate large spirit levels as well as small spirit levels in the upright (or a substantially upright) position (see FIG. 1).

Figure 3:
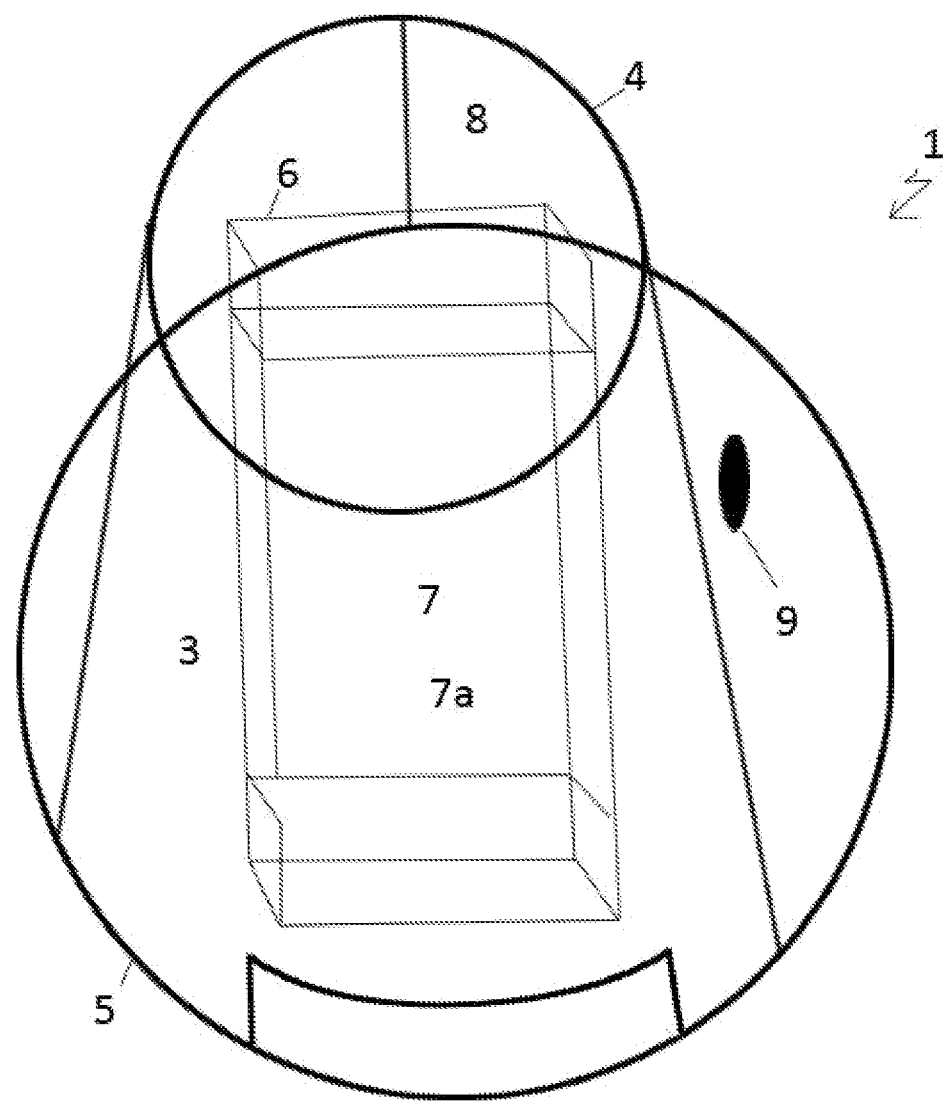
FIG. 3 is a drawing of the side view of the receptacle of FIG. 1 including internal details.

FIG. 3 shows a cross sectional view of the receptacle 1. Suitably the receptacle 1 includes a rebated handle 9 for ease of carrying/lifting. The handle may be 100 mm wide, 30 mm long and 30 mm deep. The body 3 includes a solid base suitably having a depth of about 50 mm.

It will be appreciated that the measurements referred to above can be varied. In one or more embodiments the dimensions may vary within the range (although dimensions outside these ranges could also be used):
 diameter of the relatively flat portion—100 mm to 225 mm;
 dimensions of the opening—50 mm to 100 mm length and 20 to 50 mm width;
 channel depth range—200 to 400 mm;
 length from the edge of the substantially flat portion to the base—250 to 500 mm;
 diameter of the base—200 to 500 mm;
 total weight of the receptacle—2 kgs to 15 kgs;
 handle rebate range—70 mm to 120 mm wide, 15 mm to 40 mm depth and height; and
 solid base depth—10 to 150 mm.

Figure 4A:
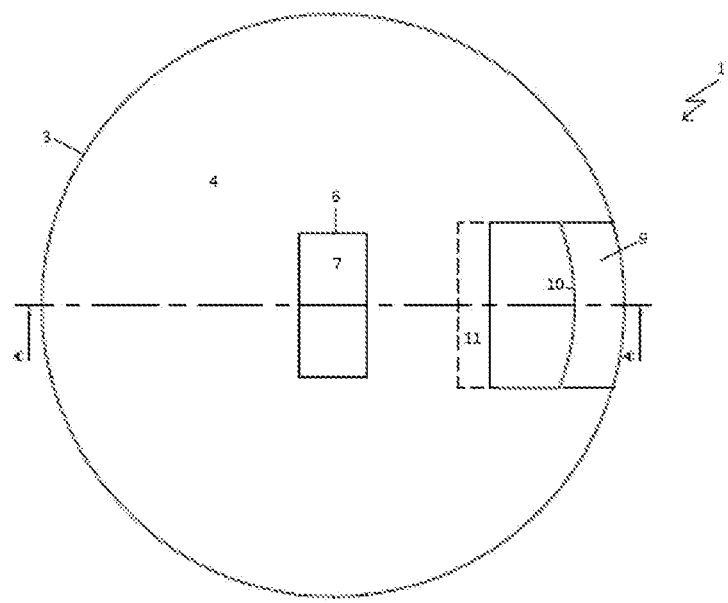
FIG. 4A is a drawing of the top view of a receptacle in accordance with another embodiment of the invention.
Figure 4B:
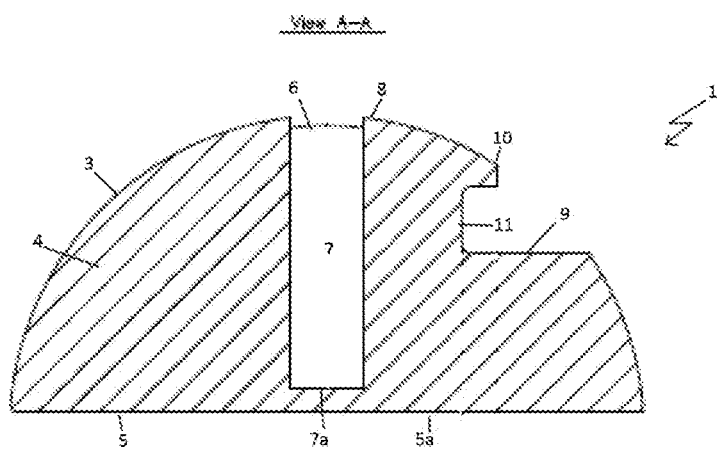
FIG. 4B is a cross-section of the receptacle of FIG. 4A taken along the line A-A.
Figure 4C:
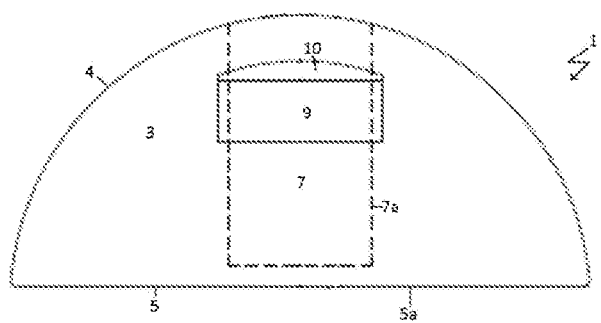
FIG. 4C is a side view of the receptacle of FIG. 4A.

FIGS. 4A, 4B and 4C show another embodiment of a receptacle 1 for seating a spirit level, straight edge tool or other hand tool. In this embodiment the receptacle 1 is in the form of a dome having a semi spherical body 3, an upper surface 4 and a base 5. The base has a flat portion 5a enabling the user to place it on a flat surface. In this embodiment the receptacle has a diameter of 280 mm, a radius of curvature of about 140 mm and a height from top to base of about 131 mm (prior to applying the opening 6—see FIG. 4C), A rectangularly shaped centred opening 6 is provided in the upper surface 4 for receiving the spirit level 2 and providing access to a rectangularly shaped internal space 7 in the form of a channel 7a (shown in ghosting in FIG. 4c) having similar dimensions to the opening 6 for seating at least a portion of a spirit level, straight edge tool or other hand tool. In this embodiment there is about 10 mm between the bottom of the channel 7a and the base 5. Suitably the opening has dimensions of 70 mm length and 32 mm width so as to accommodate a standard commercially available spirit level 2. The channel 7a is directed vertically from the opening towards the base 5. In this embodiment the body 3 includes a rebated handle 9 for ease of carrying/lifting and includes a lip 10 defining a recessed portion 11 (shown in ghosting in FIG. 4B). Suitably the rebated handle is located about 70 mm from the base and has a width of about 80 mm, a height of about 30 mm but an increased depth of about 80 mm forming an about 16 mm recessed portion defined by lip 10. The dimensions of the receptacle can vary as set out above suitably by a margin (plus or minus) 30%.

In one or more embodiments the invention has the advantage that it can temporarily house or store a spirit level, straight edge tool or other hand tool at a worksite safely but is easily and quickly accessible and is readily portable so that it can be easily moved within the worksite and from site to site. In this regard it is possible to place the receptacle right next to a working area. Further in one or more embodiments by using a bottom heavy design it is possible to keep the spirit level, straight edge tool or other hand tool upright or substantially upright when not in use. Another advantage is that it can be easily stored in a tool box when taken offsite and the spirit level, straight edge tool or other hand tool is easily locatable.

Whilst this invention has been described with respect to building and construction industry where it may be used for example by carpenters, plasterers, brick layers, landscapers, the receptacle can be used for seating a spirit level, straight edge tool or other hand tool in other industries where spirit levels, straight edge tools or other hand tools are used, for example, DIY, agriculture and machine spare parts manufacture.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

Throughout this specification and the claims that follow, unless the context requires otherwise the words "comprise", "comprises", "comprising" will be understood to mean the inclusion of the stated integer, step or group of integers or steps but not the exclusion of any of other integer, step or group of integers or steps.

The invention claimed is:

1. A portable receptacle for temporarily storing at least a portion of a spirit level at a worksite, wherein the portable receptacle includes a semi-spherical, dome shaped or conical body having a circular base and an upper surface, the upper surface including an opening for receiving the spirit level and providing access to an internal space provided in the body for temporarily storing at least a portion of the spirit level, wherein the opening has a length of 50 mm to 100 mm and a width of 20 mm to 50 mm, and wherein the internal space has a shape complementary to temporarily accommodate at least a portion of the spirit level.

2. The portable receptacle according to claim 1, wherein the body includes a recessed handle.

3. The portable receptacle according to claim 2 wherein the recessed handle includes a recessed portion with a lip at an outer portion of the recessed portion.

4. The portable receptacle according to claim 1, wherein the base includes a flat portion.

5. The portable receptacle according to claim 1, wherein the upper surface includes a flat portion.

6. The portable receptacle according to claim 1, wherein the opening and/or internal space is rectangular in shape.

7. The portable receptacle according to claim 1, wherein the internal space is cuboidal in shape.

8. A method for temporarily storing a spirit level by placing at least a portion of the spirit level into a portable receptacle according to claim 1.

9. A portable receptacle according to claim 1 wherein the total weight of the portable receptacle is from 2 to 15 kilograms.

10. A portable receptacle according to claim 1 wherein the body is solid.

11. A combination of a spirit level and a portable receptacle according to claim 1.

* * * * *